United States Patent [19]

Sato et al.

[11] 4,221,828

[45] Sep. 9, 1980

[54] PROCESS OF PRODUCING METAL SULFIDE POWDER COATED WITH COPPER

[75] Inventors: Haruki Sato; Yoshio Kawasumi, both of Urawa, Japan

[73] Assignee: Nihon Kogyo Kabushiki Kaisha, Tokyo, Japan

[21] Appl. No.: 959,028

[22] Filed: Nov. 8, 1978

[30] Foreign Application Priority Data

Nov. 11, 1977 [JP] Japan ................................. 52-134726

[51] Int. Cl.$^2$ ............................................. B05D 7/00
[52] U.S. Cl. ................................... 427/217; 428/403; 252/26
[58] Field of Search .......................... 427/217; 252/26; 428/403

[56] References Cited

U.S. PATENT DOCUMENTS

| 2,664,363 | 12/1953 | Meth | 427/168 |
| 2,748,023 | 5/1956 | Meth | 427/168 |
| 3,956,528 | 5/1976 | Ugro | 427/426 |

*Primary Examiner*—Sam Silverberg
*Attorney, Agent, or Firm*—Seidel, Gonda, Goldhammer & Panitch

[57] ABSTRACT

Metal sulfide powder coated with copper is produced by mixing powder of a metal and/or an alloy baser than copper with powder of a metal sulfide, and then adding an acidic solution containing copper ions to the resulting mixture with stirring. The metal sulfide particles are coated with metallic copper that results from a cementation reaction. Where the metal sulfide powder contains too coarse or fine particles, it is ground, granulated, and sized before the mixing.

13 Claims, No Drawings

PROCESS OF PRODUCING METAL SULFIDE POWDER COATED WITH COPPER

BACKGROUND OF THE INVENTION

This invention relates to a process of producing composite powder which consists of metal sulfide particles coated with copper in a thin film. More particularly, the invention is concerned with a process of producing such powder by coating the particles of a metal sulfide, such as molybdenum disulfide or tungsten disulfide, with copper in the form of a thin layer made by a cementation reaction between copper ions and a metal and/or an alloy baser than copper.

The copper-coated metal sulfide powder thus obtained is exceedingly desirable as solid lubricant for use in the self-lubricating powder materials to be shaped and sintered to oilless bearings, sliding parts, and the like.

The self-lubricating parts such as those of oilless bearings have usually been prepared by mixing the powder of copper, tin, or other metal, as the base, with the powder of molybdenum disulfide, graphite or other solid lubricant, pressing the mixture in dies to produce compressed shapes, sintering the shapes, and finally impregnating the products with oil. However, even if such solid lubricating powder of molybdenum disulfide, graphite or the like, is directly added to the base metal powder, a good self-lubricating product is not obtainable for a number of reasons including the infeasibility of achieving uniform mixing and low strength attained on sintering. Therefore, it is desirable that the powder of solid lubricant, as of molybdenum disulfide or graphite, be not employed directly as it is but in the form of a composite powder in which the individual particles are thinly coated with copper, nickel, or other second metal.

Such composite powders are available in a number of known and possible combinations of solid lubricant particles as cores and metals in the form of coating films. Typical of them are the combinations of molybdenum disulfide, tungsten disulfide or other metal sulfide powder and a copper coating.

Methods of producing the composite powder have heretofore depended on thermal decomposition, reduction, vapor-phase reaction, plating reaction, and vacuum evaporation. However, they have a variety of disadvantages in the process of manufacture, quality of the product, and in respect of the equipment required. No method has been established yet which will produce a composite powder of a high, stable quality in a simplified process on an industrial scale. More recently, some proposals have been made for the manufacture of composite powder. One of them is a method, disclosed by Japanese Patent Application Public Disclosure No. 32436/1976, for coating core particles of a non-metal, alloy, or metal with copper. The method consists of dispersing the core particles in an ammoniacal ammonium salt solution containing dissolved nickel, reacting the resulting slurry with a reducing gas at a high temperature and a high pressure so that the core particles can be coated with nickel, taking out the nickel-coated powder from the solution, redispersing the particles in a solution of copper adjusted to pH 7 or less, and obtaining copper-coated powder by replacing nickel with copper through a cementation reaction. According to the method, it is not until the nickel once applied on the core particles has been replaced by copper that the eventual copper coating is attained. The double procedure necessitates an accordingly large number of steps, calling for much time and labor.

Another example is Japanese Patent Application Public Disclosure No. 82871/1976. It teaches a technique aimed at coating the particles of a powdery lubricant, e.g., graphite, molybdenum disulfide, or boron nitride, with one of various metals, e.g., copper, silver, nickel, iron, or aluminum. In this method, the powder of a lubricant ranging in particle size from 1 to $2000\mu$ is mixed into a dispersion of aforementioned metal powder, in the range of $0.05$–$500\mu$, in a solvent, thereby allowing the metal particles to adhere to the lubricant particles, and after the filtering, in order to attain more strong and stable adhesion, the coated particles obtained are baked with heat in a hydrogen stream or a mixed stream of hydrogen and nitrogen. This method again requires much time and labor because of the very cumbersome steps of mixing, separation by filtration, and heating following the filtration. Apparently the adhesion of the metal particles upon the lubricant particles is weak and they have to be handled with the greatest possible care prior to the heating.

From the foregoing it is not too much to say that the two methods described above admit of much improvement, especially in simplification of the steps. The present invention has been arrived at after an extensive search for a method of manufacturing composite powder on an industrial scale in a more simplified and yet more positive way than the prior art techniques, the method being primarily directed to the typical composite powder consisting of metal-sulfide type solid lubricant core particles and copper coating.

It has now been found that the coating of metal sulfide particles with copper can be done in a simple way of mixing and succeeding cementation treatment in a single vessel, by suitably choosing the particle size of the metal sulfide, composition of the copper solution, kind and size of the metal to be added, state of agitation and conditions for cementation. The present method needs no step of preliminarily applying nickel on the lubricant particles, transferring the powder to another vessel, or heating the coated particles. Experiments have indicated that the composite powder thus prepared, when added as a solid lubricating part, would give an excellent self-lubricating powder material to be sintered. Thus, the method of the invention is quite satisfactory not only because of the simplicity but also from the viewpoint of quality of the product.

BRIEF SUMMARY OF THE INVENTION

In brief, this invention provides a process of producing metal sulfide powder coated with copper, characterized by the steps of adding and mixing powder of a metal or alloy baser than copper with powder of a metal sulfide, and adding an acidic solution containing copper ions to the mixture with stirring, whereby the metal sulfide particles are coated with the metallic copper formed in a cementation reaction.

DETAILED DESCRIPTION

The present invention will now be described in detail.

Suitable metal sulfide powder for use in the invention is of a particle size between $-5$ mesh and $+400$ mesh. Particles larger than 5 mesh in size will have ununiform coating, whereas those finer than 400 mesh will give copper-coated powder which poses the problems of low fluidity and surface oxidation. The metal sulfide is typically represented by molybdenum disulfide or tungsten disulfide, although others may be employed when desired.

As regards the acidic solution containing copper ions, its copper concentration is not definitely determined since it varies with the size of the particular metal sulfide powder and the quantity of copper is to be used in coating. Generally, the concentration may range from 0.5 g/l to a saturation value. Where the quantity of copper for coating is 50% by weight of that of the metal sulfide, a copper concentration in the range of 30-60 g/l is desirable. As the copper source, the salts of sulfuric, hydrochloric, nitric, and organic acids (hereinafter called "copper salts") prove substantially equally effective, but coppr sulfate is the most preferred. Another factor to be taken into consideration is the concentration of the free acid. Among the useful acids are sulfuric, hydrochloric, nitric, acetic, and oxalic acids. Their concentrations cannot be definitely determined, either. In case of sulfuric acid, 0.5 g/l or more will genrally have the same effect. If the acid concentration is less than 0.5 g/l, the resulting copper-coated metal sulfide powder will not only turn reddish brown but will show ununiform coating.

The powder of a metal and/or an alloy baser than copper, which is to react with copper ions, may be the powder of zinc, iron, aluminum, magnesium, calcium, or the like or of an alloy of such metals. While these powders are similarly effective, economics dictates the use of iron powder, especially reduced iron powder. Desirably the particle size ranges from $-100$ to $+400$ mesh. If the powder contains many particles coarser than 100 mesh, the coating will become uneven. Conversely if the proportion of particles finer than 400 mesh is high, the particles will be largely dissolved by a reaction with the free acid in the process of cementation and will be consumed without taking part in the reaction for precipitation of copper. The proper amount to be added is believed to be slightly more, say about 1.01 times larger, than the stoichiometric equivalent of the intended amount of copper to be applied on the metal sulfide particles.

In the operation, the reaction vessel is charged with a desired amount of metal sulfide powder and an amount of metal and/or alloy powder calculated on the basis of the aimed amount of copper for coating. The vessel must be provided with means for producing an adequate stirring action. With this in view, a vessel equipped with blades which will create a planetary motion is employed. While the two components are being thoroughly mixed, a copper salt solution is added. This is desirably done in such a way that the addition up to realization of the funicular [II] region takes a relatively long period, for example from 20 seconds to 10 minutes, and then the slurry region is reached in a short period of from 5 to 10 seconds. If the time period held in the slurry region is unduly extended, the iron powder and the powder to be coated would separate from each other, making it unable for the precipitated copper to serve the coating purpose. The terms "funicular region" and "slurry region" will be explained later. The periods of time for those regions vary with the powder quantities, agitation efficiency, and other factors. The copper salt solution is desired to be added batchwise, because it adds to the uniformity of the mixture. Following the completion of the addition of a given amount of the copper salt solution sitrring of the mixture is continued, e.g., for about 30 seconds. After the stirring, the resulting composite powder is recovered. Under the invention the quantity of copper to be applied can be controlled within the limits of the desired value plus or minus 0.5%.

As a starting material the metal sulfide powder sometimes is too fine or contains a large proportion of exceedingly flat particles or has an excessively broad range of particle size, depending on the source from which the material is derived. In such cases, preliminary granulation and/or sizing of the granules or particles will prove highly beneficial. By way of example, the metal sulfide powder may be ground and granulated by a grinding-granulating mixer, e.g., a Henschel mixer, using a binder prepared by diluting a resol and/or novalak type phenol resin with alcohol. Following this, the excess alcohol is evaporated and collected for reuse. After the alcohol has vaporized, the granules are classified by sieving to obtain those in the desired range of size. Too coarse and fine particles outside the desired range are sent back to the Henschel mixer, where they are once again subjected to grinding and granulation, this time with the addition of alcohol only. The second grinding and granulation produces additional granules of the size in the intended range. The product is sieved and too coarse and fine particles are returned to the mixer again. Repetition of this procedure permits eventual granulation and sizing of all the material powder to granules of a predetermined size. The powder now takes the form of uniform spherical granules suited as the metal sulfide particles to be coated with copper. Curing at 100°-300° C. for 0.5-2.0 hours stabilizes the particles. In case of a novolak resin, hexamine or the like may be used for the stabilization purpose. The quantities of the resin and alcohol required depend upon the size and shape of the metal sulfide particles and the desired size and shape of the final particles. Generally, however, a resin amount in the range of 2-40% of the composition will not materially affect the properties of the solid lubricant. With regard to alcohol, the amount must be within the range enough for maintaining the funicular [I] and [II] regions. When the capillary or even slurry region has been reached, it is not objectionable to evaporate the excess alcohol down to either funicular region.

By the procedure described immediately above, any material at hand, which would otherwise be of no use in the process of the invention, is made usable through granulation and sizing to a particle size within a predetermined range. Thus, metal sulfide powders of particle sizes beyond the ordinary limits can now be employed. In addition, the use of sized particles brings uniformity of the reaction and hence evenness of copper coating.

EXAMPLE 1

With the view to obtaining molybdenum disulfide powder coated with copper in an amount of 50% by weight, the procedure now to be described was followed. 200 g of natural molybdenum disulfide powder, ranging in particle size from $-80$ to $+400$ mesh, and 177.2 g of reduced iron powder, from $-100$ to $+400$ mesh in size, were charged into a cementation vessel equipped with blades for planetary motion. The amount of reduced iron powder was 1.01 times as much as the theoretical amount found necessary on stoichiometric calculation. While the charge was being thoroughly stirred by the blades, an acidic copper sulfate solution containing 48 g of copper and 200 g of sulfuric acid per liter was added little by little, and the funicular [II] region was reached in about 30 seconds. The amount of the acidic copper sulfate solution added up to that point was 1.0 l (48 g in terms of copper). Following this, a complete slurry region was arrived at in about 3 seconds, and the remainder of the acidic copper sulfate solution required was added over a period of about 10 seconds. The total amount of the copper sulfate solution added was 3.2 l, or 154 g in terms of copper. After the addition, stirring was continued for an additional period of about 30 seconds, and the copper coating treatment was concluded. The coated powder was recovered, washed, and dried, and finally 396g of copper-coated molybdenum disulfide powder was obtained. The individual particles were evenly coated with copper, which was similar to commercially available copper powder in the tone of color. The copper coating accounted for 49.5% of the total weight. The composite powder thus obtained was under 60 mesh in particle size.

EXAMPLE 2

In order to obtain tungsten disulfide powder coated with 50% by weight of copper, a copper sulfate solution was added to a mixture of tungsten disulfide and reduced iron powder generally in the same manner as described in Example 1. The amount of addition and the stirring conformed to the conditions specified in the preceding Example. A composite powder with 49.5% copper coating resulted. Its color tone was quite satisfactory.

EXAMPLE 3

To conform the effect of sizing by preliminary grinding and granulation of metal sulfide powder, 1000 g of commercially available "Molykote" (the trade designation of molybdenum disulfide sold by Amax Co.) was ground and granulated. Molykote had a relatively wide range of particle size distribution. Molykote was placed in a Henschel mixer, 167 g of phenol resin (with 100 g of solid contents) diluted with 80 ml methanol was added as a granulating binder, and the grinding and granulating treatment was carried out for about 10 minutes. The resultant granules were dried at 70° C. for 0.5 hour and sieved, when 400 g of granulated molybdenum disulfide powder ranging in particle size from −150 to +250 mesh resulted. The remainder of powder composed of +150 and −250 mesh particles was returned to the Henschel mixer, where it was once again ground and granulated with the addition of 40 ml of methanol. After sieving, the above procedure was repeated until about 95% of the initial amount of Molykote became granules of molybdenum disulfide ranging in size from −150 to +250 mesh. This granulated powder was cured at 120° C. for one hour and 300° C. for further one hour. After resieving, 980 g of molybdenum disulfide powder, granulated and sized to the range from −150 to +250 mesh, was obtained. The particles were spherical and uniform.

Using 200 g of this powder, 399 g of copper-coated molybdenum disulfide powder was obtained by the same procedure as described in Example 1. The composite powder thus prepared had uniform coating of copper, showing the same color tone as that of commercially available copper powder. The total amount of copper coating was 49.9% of the total weight, and all particles were 80 mesh or finer in size.

From the foregoing description it will be understood that the process of the invention permits continuous operation with a single vessel, in a very simplified way without the necessity of extra time or labor as in the conventional methods. Moreover, the product composite powder is impeccable in external appearance. It is also of importance that the invention has opened a way for utilization of the raw metal sulfide powder of particle sizes outside the normally desirable range. With these advantages, the present invention contributes greatly to the technical progress of the art.

Lastly, the terms "funicular [I] and [II] regions" and the like herein used will now be explained. The state of packing and fluidity of solid-liquid systems, which is originally very difficult to define, is divided, in a known practice, into five stages according to the degrees of packing and fluidity and are designated respectively. In conformity with this five-stage indication method, the conditions of powder-liquid mixtures are herein defined as follows:

| Region | Solid phase | Liquid phase | Condition | Fluidity |
|---|---|---|---|---|
| (1) Pendular | Continuous | Discontinuous | loose | Dilatant dispersion |
| (2) Funicular [I] | " | Continuous | " | Psuedoplastic dispersion |
| (3) Funicular [II] | " | " | " | Plastic dispersion |
| (4) Capillary | Discontinuous | " | Viscous | Shear Hardened dispersion |
| (5) Slurry | Discontinuous | " | Muddy | False body dispersion |

What is claimed is:

1. A process of producing metal sulfide powder coated with copper comprising the steps of:
   providing preliminarily granulated and sized power of a predetermined size range of a metal sulfide,
   mixing the powder of metal sulfide with powder of a metal and/or an alloy baser than copper, and
   adding to the mixture produced an acidic solution containing copper ions with stirring in such manner that the funicular (II) region is reached in about twenty seconds to ten minutes and then the slurry region is reached in five to ten seconds,
   whereby the particles of the metal sulfide powder are coated with metallic copper that results from a cementation reaction.

2. A process according to claim 1 wherein the metal sulfide powder is selected from the group consisting of molybdenum disulfide powder and tungsten disulfide powder.

3. A process according to claim 1 wherein the metal sulfide powder has a particle size between about −5 mesh and +400 mesh.

4. A process according to claim 1 wherein the acidic solution containing copper ion has a copper concentration of about 0.5 grams/liter to saturation value.

5. A process according to claim 1 wherein the source of copper ions is selected from the salts of sulfuric, hydrochloric, nitric, and organic acids thereof.

6. A process according to claim 5 wherein the source of copper ions is copper sulfate.

7. A process according to claim 1 wherein the acid to be employed is selected from the group consisting of sulfuric acid, hydrochloric acid, nitric, acetic and oxalic acid.

8. A process according to claim 1 wherein the metal and/or alloy powder baser than copper is selected from the group consisting of powders of zinc, iron, aluminum, magnesium, calcium or an alloy thereof.

9. A process according to claim 1 wherein the metal and/or alloy powder baser than copper is the powder of reduced iron.

10. A process according to claim 1 wherein the metal and/or alloy powder baser than copper has a particle size range from −100 to +400 mesh.

11. A process according to claim 1 wherein the metal sulfide powder is sized and granulated by a grinding-granulating mixer being a binder prepared by diluting a resol and/or novolak type phenol resin with alcohol.

12. A process according to claim 11 wherein granulated particles are cured at about 100° to 300° C. for 0.5 to 2.0 hrs.

13. A process according to claim 1 wherein said preliminary granulation and sizing is effected by charging the starting metal sulfide powder into a grinding-granulating mixer together with a binder prepared by diluting a resol and/or novolak type phenol resin with alcohol, to grind and granulate the powder, evaporating the alcohol, sieving the resultant granules, returning into the mixer the coarse and fine particles outside the intended range with only addition of alcohol and repeating said procedure until all the starting powder is sized to the intended range.

* * * * *